United States Patent
Barnes et al.

(10) Patent No.: US 7,948,489 B1
(45) Date of Patent: May 24, 2011

(54) MINIMIZING TESSELLATION OF SURFACES

(75) Inventors: David D. Barnes, San Ramon, CA (US);
Douglas R. Becker, Ayer, MA (US);
Dennis Kauffman, San Jose, CA (US);
Kazuhiro Toyoda, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 926 days.

(21) Appl. No.: 11/755,486

(22) Filed: May 30, 2007

(51) Int. Cl.
*G06T 15/30* (2006.01)
(52) U.S. Cl. .................. 345/423; 345/419; 345/420
(58) Field of Classification Search .................. None
See application file for complete search history.

(56) References Cited

U.S. PATENT DOCUMENTS

| | | | |
|---|---|---|---|
| 5,261,029 A | 11/1993 | Abi-Ezzi et al. | |
| 5,428,718 A | 6/1995 | Peterson et al. | |
| 5,889,524 A * | 3/1999 | Sheehan et al. | 345/419 |
| 5,914,721 A * | 6/1999 | Lim | 345/421 |
| 6,211,883 B1 | 4/2001 | Goel | |
| 6,591,004 B1 * | 7/2003 | VanEssen et al. | 382/154 |
| 6,664,960 B2 | 12/2003 | Goel et al. | |
| 6,911,980 B1 | 6/2005 | Newell et al. | |
| 7,109,987 B2 | 9/2006 | Goel et al. | |
| 7,142,206 B1 | 11/2006 | Moreton | |
| 7,212,205 B2 | 5/2007 | Uesaki et al. | |
| 7,245,299 B2 * | 7/2007 | Sfarti | 345/423 |
| 7,750,914 B2 * | 7/2010 | Lake et al. | 345/531 |
| 2005/0033471 A1 * | 2/2005 | Ohmori et al. | 700/182 |

* cited by examiner

*Primary Examiner* — Said Broome
(74) *Attorney, Agent, or Firm* — Robert C. Kowert; Meyertons, Hood, Kivlin, Kowert & Goetzel, P.C.

(57) ABSTRACT

A method, system, and computer-readable storage medium are disclosed for minimizing tessellation of surfaces. A first plurality of polygons may be generated, wherein the first plurality of polygons are adjacent to a plurality of boundaries of a surface. Each of the first plurality of polygons comprises at least one outside edge approximating a straight line within a first flatness tolerance. A second plurality of polygons may be generated, wherein the second plurality of polygons are on the interior of the surface. Each of the second plurality of polygons comprises a plurality of inside edges approximating the straight line within a second flatness tolerance. The first flatness tolerance may be smaller than the second flatness tolerance.

33 Claims, 10 Drawing Sheets

Simplified Tessellated Patch 120

MINIMIZING TESSELLATION OF SURFACES

BACKGROUND

1. Field of the Invention

The present invention is directed to computer systems; and more particularly, it is directed to the tessellation of surfaces using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, Bézier curves, and text characters) may be based upon mathematical equations to represent parts of digital images. The geometric objects may typically be located in two-dimensional or three-dimensional space. Suitable image editors, such as Adobe Illustrator® (available from Adobe Systems, Inc.), may be used to perform operations on these objects. Typical operations include rotation, translation, stretching, skewing, changing depth order, and combining objects with other objects. While raster graphics may often lose apparent quality when scaled to a higher resolution, vector graphics may scale to the resolution of the device on which they are ultimately rendered.

To render vector graphics on raster-based imaging devices (e.g., most display devices and printers), the geometric objects are typically converted to raster graphics data in a process called rasterization. Prior to final rasterization, surfaces defined by the geometric objects may be covered with non-overlapping polygons (e.g., triangles or quadrilaterals) in a process called tessellation. The polygons may also be referred to as tessellae, and the arrangement of non-overlapping polygons may be referred to as a mesh. Each polygon is defined by at least three vertices, and each vertex may be characterized by color and alpha values. Because tessellation of a shaded surface may produce many polygons, a surface may be rendered with fine variations in the color and alpha values. Each polygon (e.g., quadrilateral) in the surface may be further subdivided into Gouraud shaded triangles for rendering to an output device.

A geometric object referred to herein as a patch may be defined by four cubic Bézier curves. Using a prior approach, tessellation of a patch proceeds recursively by subdividing the patch into successively smaller elements. The recursion may terminate when the edges of a new subdivision approximate a straight line according to a uniform flatness parameter. FIG. 1A illustrates a tessellated patch 110 produced by a conventional technique. Because the same flatness parameter is used throughout the patch 110, the complexity of the tessellated geometry (e.g., the density of the polygons) typically does not vary substantially within the patch 110. For example, the upper-left corner of the tessellated patch 110 contains an essentially uniform pattern of similarly-sized polygons. The computational resources used in completing the rendering process will typically scale with the number of polygons in the tessellated patch 110.

SUMMARY

Various embodiments of systems, methods, and computer-readable storage media for minimizing tessellation of surfaces are disclosed. According to one embodiment, a first plurality of polygons may be generated, wherein the first plurality of polygons are adjacent to a plurality of boundaries of a surface. Each of the first plurality of polygons comprises at least one outside edge approximating a straight line within a first flatness tolerance. A second plurality of polygons may be generated, wherein the second plurality of polygons are on the interior of the surface. Each of the second plurality of polygons comprises a plurality of inside edges approximating the straight line within a second flatness tolerance. In one embodiment, the first flatness tolerance is smaller than the second flatness tolerance.

According to one embodiment, recursive subdivision of the surface into a plurality of sub-surfaces may be initiated. Each sub-surface may comprise a plurality of edges. Each edge may be designated as either an inside edge or an outside edge relative to a plurality of boundaries of the surface. Each sub-surface of a first "outside" portion of the plurality of sub-surfaces comprises at least one of the outside edges (and, optionally, at least one of the inside edges), and each sub-surface of a second "inside" portion of the plurality of sub-surfaces comprises a plurality of the inside edges and no outside edges. The recursive subdivision may be terminated for each sub-surface of the first portion when a first flatness tolerance is met for each outside edge and a second flatness tolerance is met for each inside edge. In one embodiment, the first flatness tolerance is smaller than the second flatness tolerance. The recursive subdivision may be terminated for each sub-surface of the second portion when the second flatness tolerance is met for each inside edge.

The flatness tolerance values may indicate a maximum allowable difference between a curve and a straight line approximation of that curve. Each flatness tolerance value may represent a trade-off between rendering accuracy and rendering speed. By using two different flatness tolerance values for the outside and inside of a surface, computational resources in a tessellation may be applied differentially to different areas of the surface. According to one embodiment, the "inside" flatness tolerance and/or the "outside" flatness tolerance may be determined by user input, default values, and/or a programmatic determination.

According to one embodiment, the tessellation minimization may be applied to a Coons patch having boundaries determined by four connected Bézier curves and four implicit control points. Subdivision of a surface or sub-surface may comprise subdivision of the Bézier curves on opposing edges. According to one embodiment, the tessellation minimization may be applied to a Tensor patch having boundaries determined by four connected Bézier curves and by additional explicit control points.

DETAILED DESCRIPTION OF EMBODIMENTS

Figure 1A:
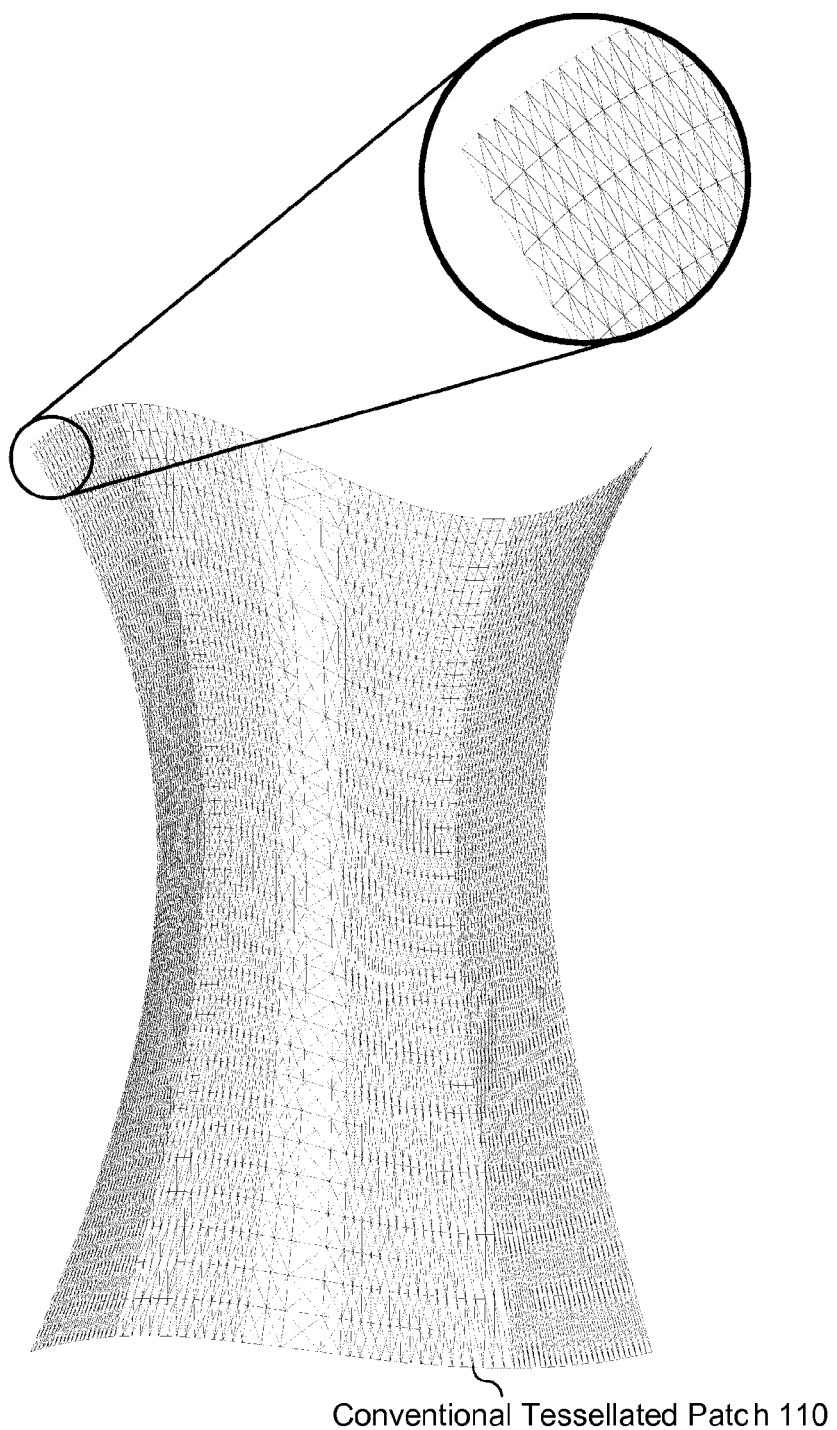
FIG. 1A illustrates a conventional tessellated patch produced by a prior approach.
Figure 1B:
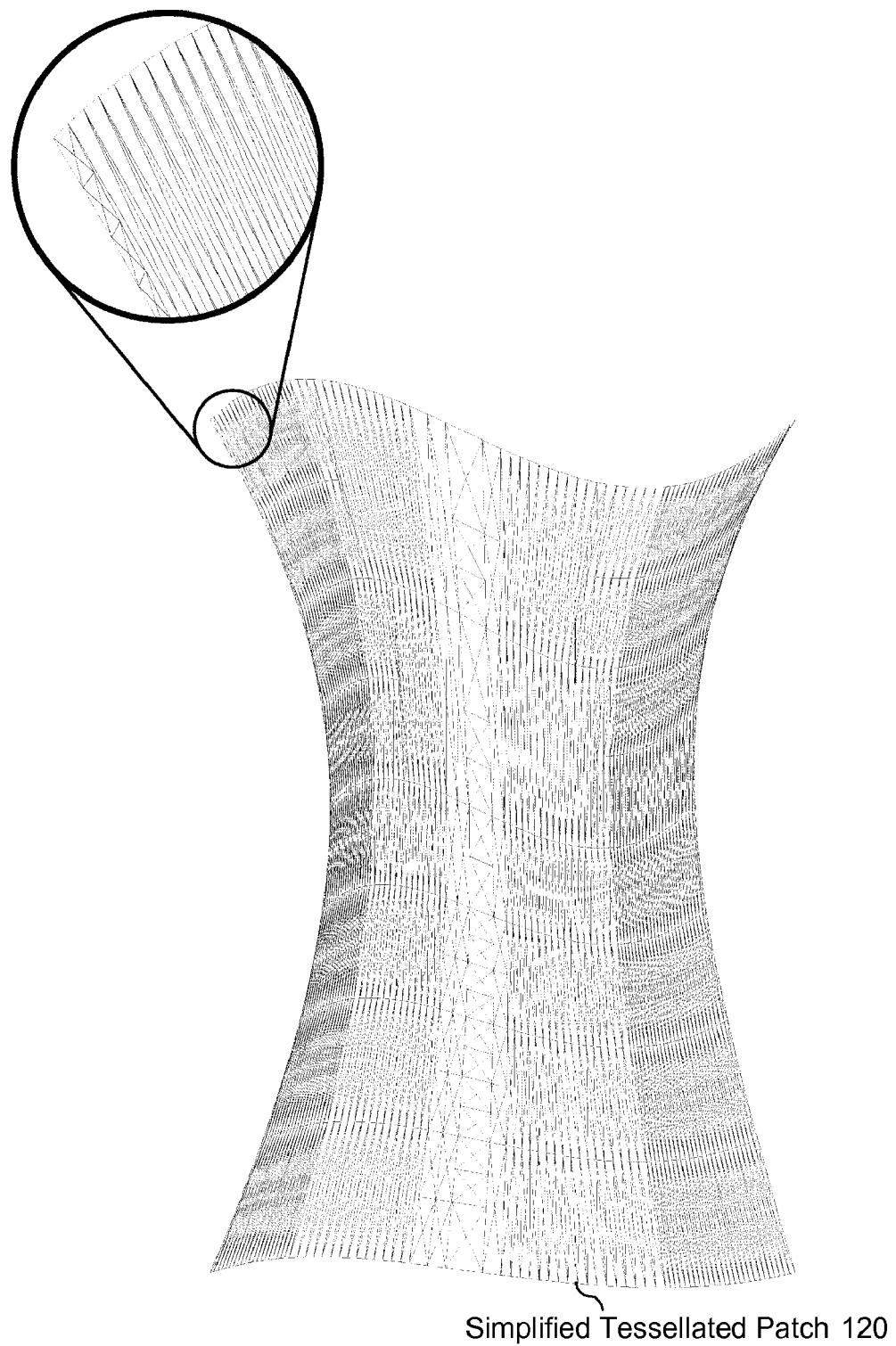
FIG. 1B illustrates a simplified tessellated patch produced by one embodiment of a system and method for minimizing tessellation of surfaces.

Various embodiments may provide minimized tessellation of surfaces to produce simplified tessellated surfaces. FIG. 1B illustrates a simplified tessellated patch 120 produced by one embodiment of a system and method for minimizing tessellation of surfaces. By varying a flatness tolerance in different areas of the patch 120, the complexity of the tessellated geometry (e.g., the density of the polygons) may vary within different areas of the patch 120. In one embodiment, as seen in the upper-left corner of the tessellated patch 120, the interior of the patch 120 may be tessellated with typically larger polygons than the polygons found along the boundaries of the patch 120. In one embodiment, the upper and lower boundaries of the simplified patch 120 may be produced with a more complex tessellation in a manner similar to the left-hand and right-hand boundaries of the patch 120 shown in FIG. 1B. In this manner, the computational resources used in completing the rendering process may be reduced for the interior of the patch 120.

Typically, human perception is more acute in detecting abrupt changes (e.g., the edges of objects) than gradual changes (e.g., smooth transitions in color on the interior of objects). In contrast to the simplified tessellated patch 120, the conventional tessellated patch 110 may include many more polygons on the interior than are necessary to produce an accurately shaded surface to the human eye. The techniques disclosed herein for minimizing tessellation of surfaces may produce faster rendering of surfaces while not sacrificing accuracy within visual perceptual limits.

In various embodiments, the techniques disclosed herein for minimizing tessellation of surfaces may be implemented in various products such as image editors and/or readers, print drivers, display drivers, and other suitable elements in a rendering pipeline. The image editors and/or readers may include various products available from Adobe Systems, Inc., such as versions of Adobe Illustrator® or Adobe Acrobat®.

In various embodiments, the techniques discussed herein for minimizing tessellation of surfaces may be applied to various types of geometric objects including surfaces. Suitable surfaces may include bicubic surfaces, B-spline surfaces, and other types of Bézier surfaces such as patches. In one embodiment, the tessellation minimization may be applied to a patch such as a Coons patch or a Tensor patch. A Coons patch may comprise a closed shape that is defined by a plurality of curves in space (e.g., two-dimensional space or three-dimensional space). In one embodiment, the boundaries (i.e., the perimeter) of a Coons patch may be determined by four cubic Bézier curves that are joined at four corners plus four implicit control points. As will be discussed in greater detail below, each Bézier curve may be defined by two endpoints and two control points. Boundaries of a Tensor patch may be further determined by additional (e.g., four) explicit control points. Although specific examples of tessellation minimization may be discussed herein for Coons patches and Tensor patches, it is contemplated that similar techniques may be applied for tessellation minimization of other types of surfaces.

In one embodiment, a surface may be tessellated by generating two types of polygons: a first plurality of "outside" polygons adjacent to the boundaries of the surface and a second plurality of "inside" polygons on the interior of the surface. Each of the outside polygons may comprise at least one outside edge that approximates a straight line within a first tolerance. Each of the inside polygons may comprise a plurality of inside edges that approximate a straight line within a second tolerance. The first tolerance is smaller than the second tolerance. As will be discussed in greater detail below, the tolerance values may relate to the "flatness" of an edge, i.e., a comparison of the edge to a straight line. By using two different tolerance values for the flatness of polygon edges, the tessellation process may generate a surface that is more complex on the boundaries (i.e., with shorter edges more closely approximating a smooth curve) and simpler on the interior (i.e., with longer edges less closely approximating a smooth curve).

Figure 2:
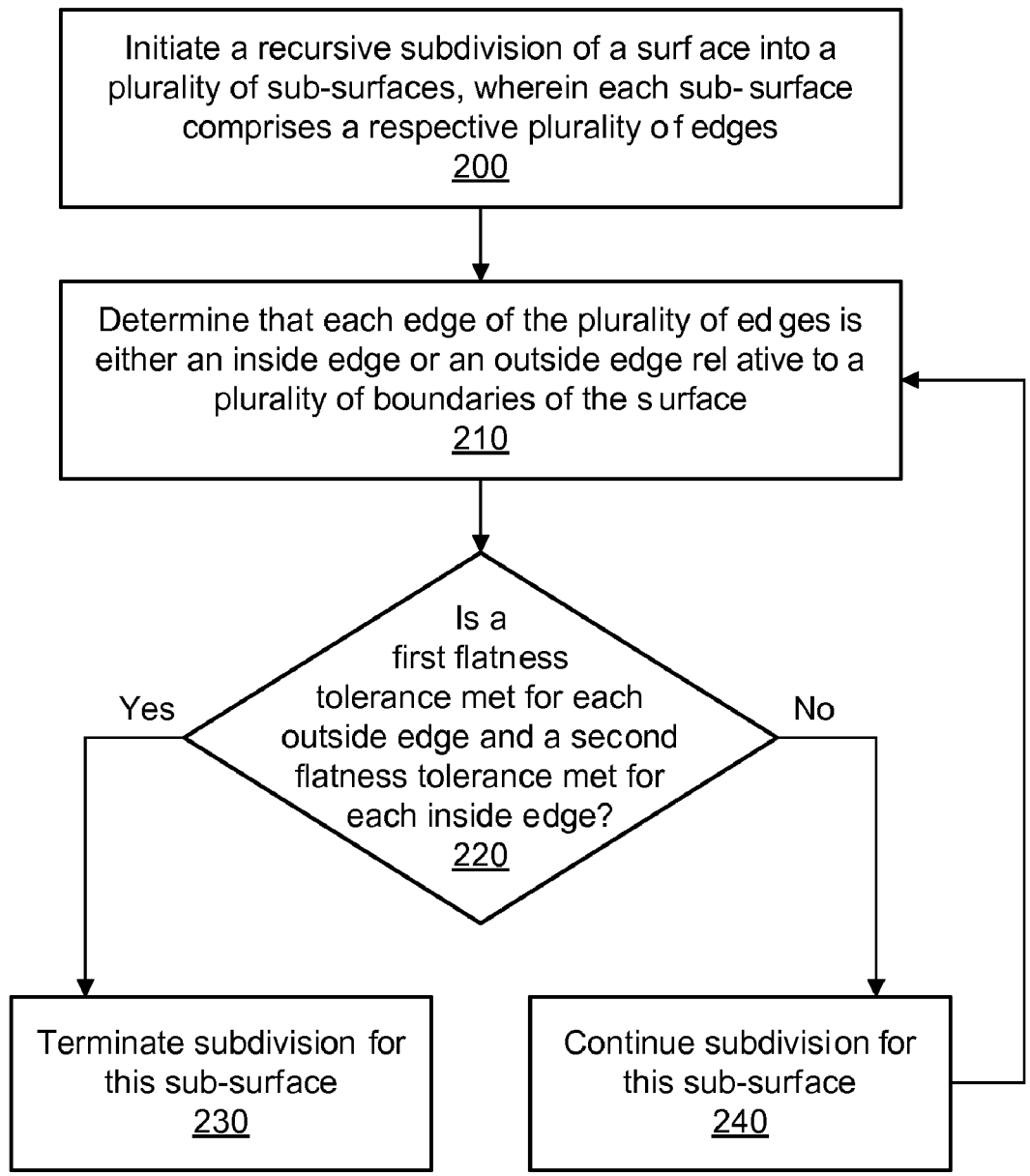
FIG. 2 is a flow diagram illustrating one embodiment of a method for minimizing tessellation of surfaces.

FIG. 2 is a flow diagram illustrating one embodiment of a method for minimizing tessellation of surfaces. As shown in block 200, a recursive subdivision of a surface into a plurality of sub-surfaces may be initiated. The operation shown in block 200 may include a first subdivision of the surface into two or more sub-surfaces. Each sub-surface generated in the subdivision may comprise a respective plurality of edges. Each edge may be defined by two endpoints (and, in the case of Bézier curves, by two control points), and edges may be shared by adjacent sub-surfaces.

As shown in block 210, it may be determined that each edge of the plurality of edges is either an inside edge or an outside edge relative to a plurality of boundaries of the surface. The determination of the insidedness or outsidedness of edges is discussed in greater detail below. As the recursive subdivision proceeds, the original surface may be divided into one portion of "inside" sub-surfaces and another portion of "outside" sub-surfaces. Each sub-surface of the outside portion may comprise at least one outside edge (and, optionally, at least one inside edge). Each sub-surface of the inside portion may comprise a plurality of inside edges and no outside edges.

As shown in block 220, a flatness determination may be made for each sub-surface generated by the recursive subdivision. Each outside edge may be tested against a first flatness tolerance value, and each inside edge may be tested against a second flatness tolerance value. In one embodiment, the first flatness tolerance may be smaller than the second flatness tolerance. The flatness tolerance values may be user-specified values, default values, or determined programmatically. The difference between the two flatness tolerance values may vary. In one embodiment, the first flatness tolerance value may be approximately half of the second flatness tolerance value. The flatness test depicted in block 220 is further discussed with respect to FIG. 6.

If the flatness tolerances are met for all the edges in a sub-surface, then recursion may be terminated for the sub-surface as shown in block 230. If the flatness tolerances are not met for all the edges in a sub-surface, then the recursive subdivision continues for the sub-surface as shown in block 240. Therefore, the recursive subdivision may be terminated for each sub-surface of the outside portion of sub-surfaces when the first flatness tolerance is met for each outside edge of the sub-surface and the second flatness tolerance is met for each inside edge of the sub-surface. Similarly, the recursive subdivision may be terminated for each sub-surface of the inside portion of sub-surfaces when the second flatness tolerance is met for each inside edge of the sub-surface. Because of the difference in the flatness tolerance values, the outside edges are required to be a closer straight line approximation (i.e., smoother) than the inside edges prior to termination of the recursion.

Figure 3:
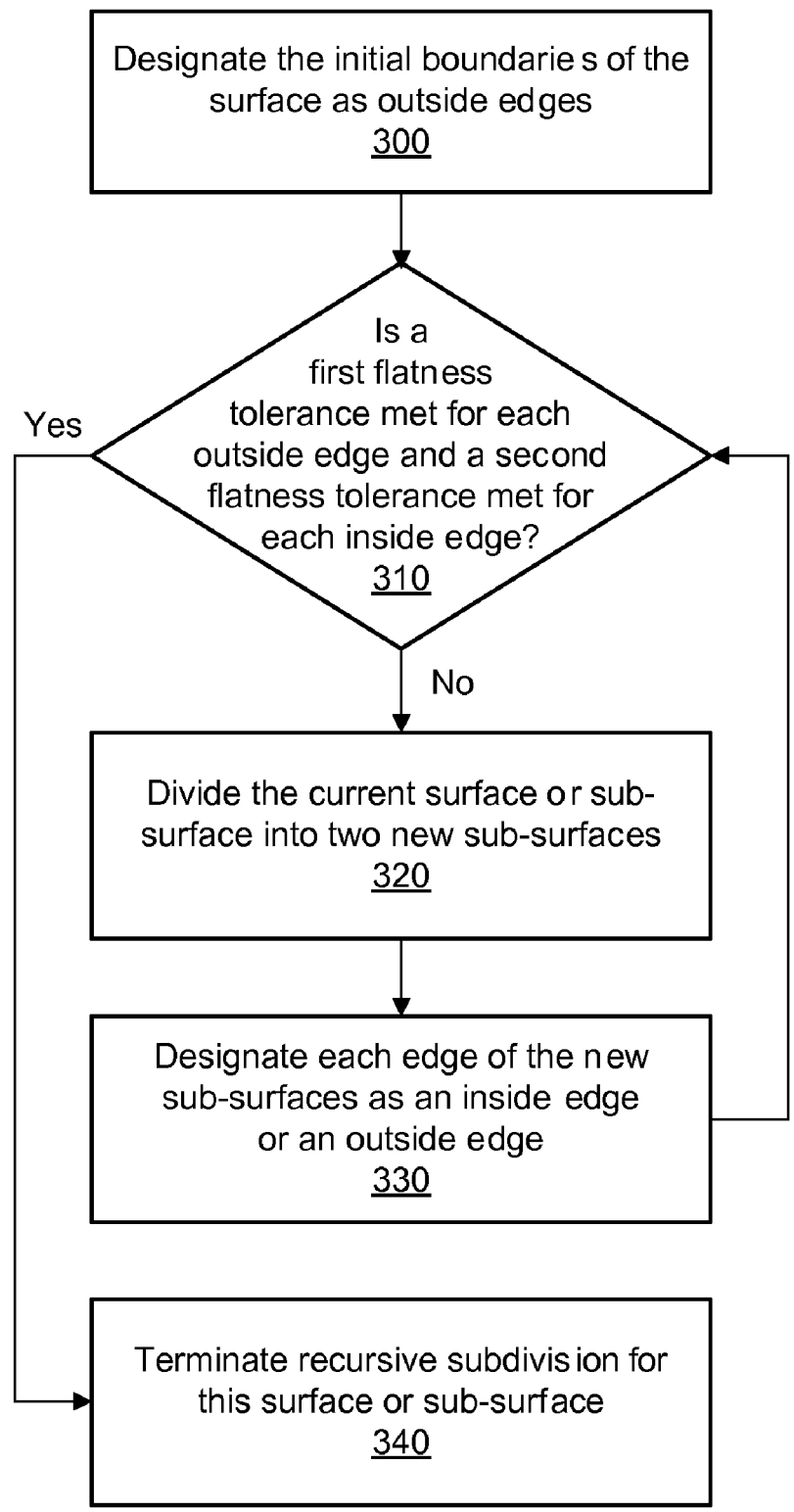
FIG. 3 is a flow diagram illustrating one embodiment of a method for minimizing tessellation of surfaces.
Figure 4A:
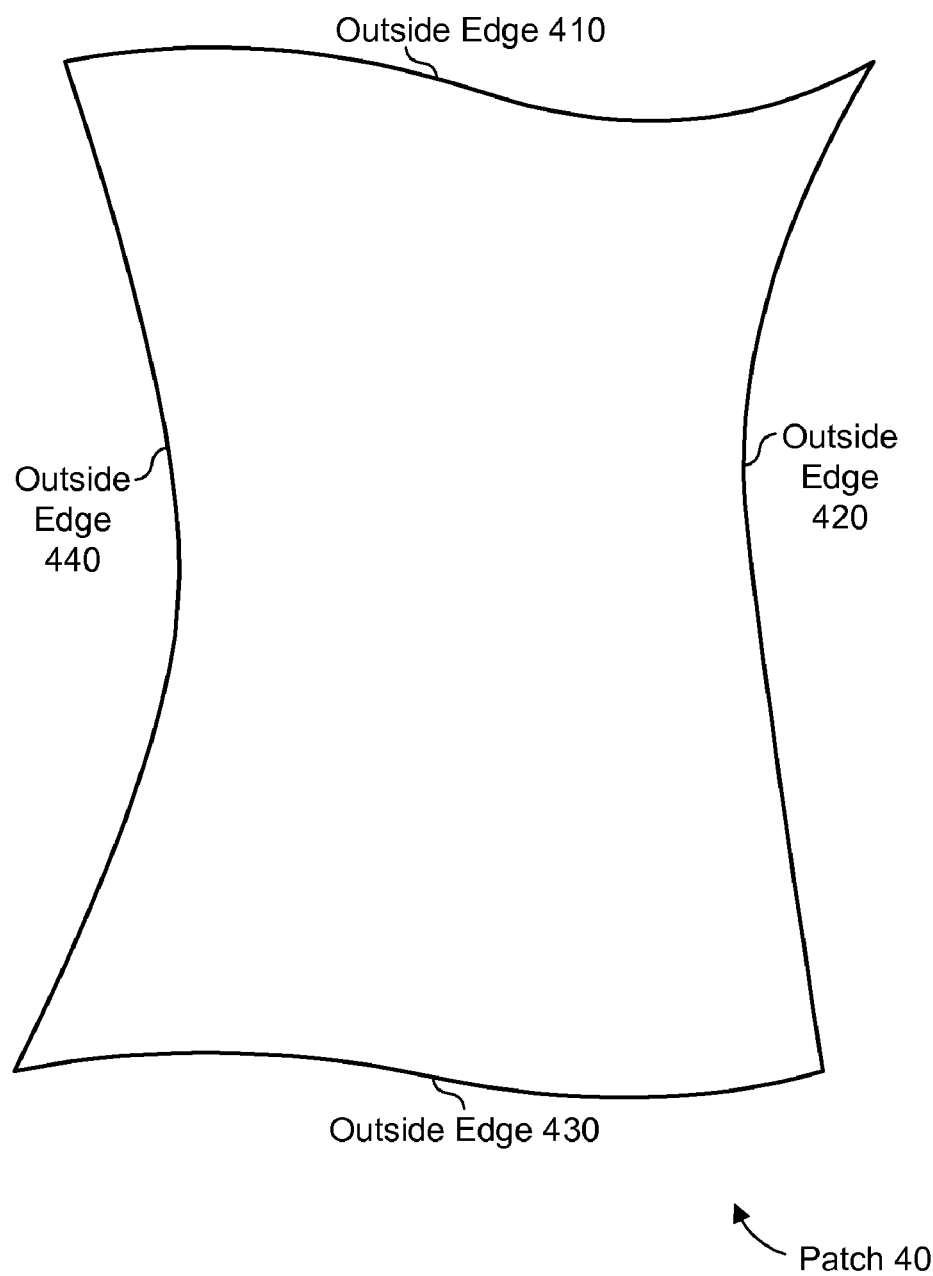
FIG. 4A illustrates a first stage of a patch tessellation according to one embodiment of a system and method for minimizing tessellation of surfaces.

FIG. 3 is a flow diagram illustrating one embodiment of a method for minimizing tessellation of surfaces. As shown in block 300, each of the outside edges of the surface may initially be designated as outside edges. FIG. 4A illustrates a first stage of a surface tessellation according to one embodiment of a system and method for minimizing tessellation of surfaces. The boundary of the patch 400A (e.g., as defined by four Bézier curves) may be designated as outside edges 410, 420, 430, and 440.

As shown in block 310, each of the edges of each surface or sub-surface at the current stage of the patch tessellation may be tested against the relevant flatness tolerance value(s). As discussed above with respect to FIG. 2, different flatness tolerance values may be applied to outside edges in comparison to inside edges. In the patch 400A shown in FIG. 4A, for example, the four outside edges 410, 420, 430, and 440 fail the flatness test with the first (i.e., outside) flatness value. If any surface or sub-surface meets the flatness tolerance values for all of its edges, then recursive subdivision of that surface or sub-surface may terminate as shown in block 340. In one embodiment, an additional test for termination may be satisfied only if the color of each edge is linear.

Figure 4B:
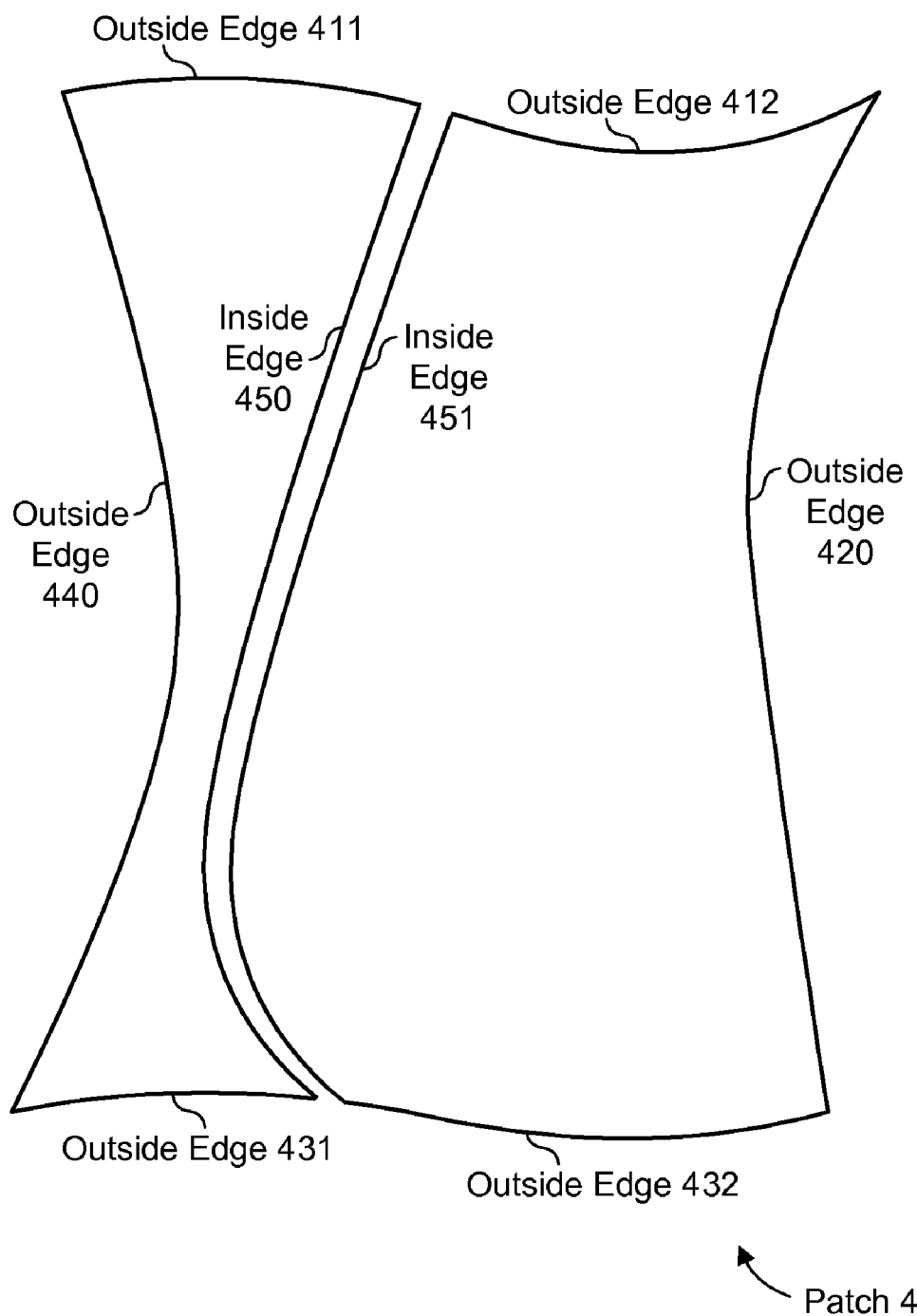
FIG. 4B illustrates a second stage of a patch tessellation according to one embodiment of a system and method for minimizing tessellation of surfaces.

As shown in block 320, each surface or sub-surface at the current stage of the surface tessellation may be subdivided. In one embodiment, each surface or sub-surface may be divided into two adjacent sub-surfaces. In one embodiment, Bézier curve subdivision may be used on opposing edges of the current surface or sub-surface to create two new sub-surfaces. Bézier curve subdivision is further discussed with respect to FIG. 5. FIG. 4B illustrates a second stage of a surface tessellation according to one embodiment of a system and method for minimizing tessellation of surfaces. As shown in FIG. 4B, the first subdivision may generate a modified patch 400B having two sub-patches.

As shown in block 330, each edge of the sub-surfaces generated at the current stage of the surface tessellation may be designated as an inside edge or an outside edge.

In patch 400B, for example, one of the new sub-patches has three outside edges 411, 440, 431 and an inside edge 450. The other new sub-patch has three outside edges 412, 420, 432 and an inside edge 451. The inside edges 450 and 451 may comprise a single shared edge.

In one embodiment, the designation of each edge as an inside or outside edge may differ depending upon the nature of the surface. Generally, the edges of the new sub-surface may inherit the inside or outside designation from the parent edge. For a Coons patch, the new edge generated where the split occurred may be designated as being an inside edge. For a Tensor patch, the new edge generated where the split occurred may be tested to determine whether it is completely inside the parent or not. The new edge in a Tensor patch may be marked as an outside edge if it bulges outside the original boundaries of the patch due to the influence of the additional control points in the Tensor patch. Generally, a bulge for any surface may be treated as an outside edge if it comprises a visually hard edge visible in the two-dimensional projection of a surface deformation.

Figure 4C:
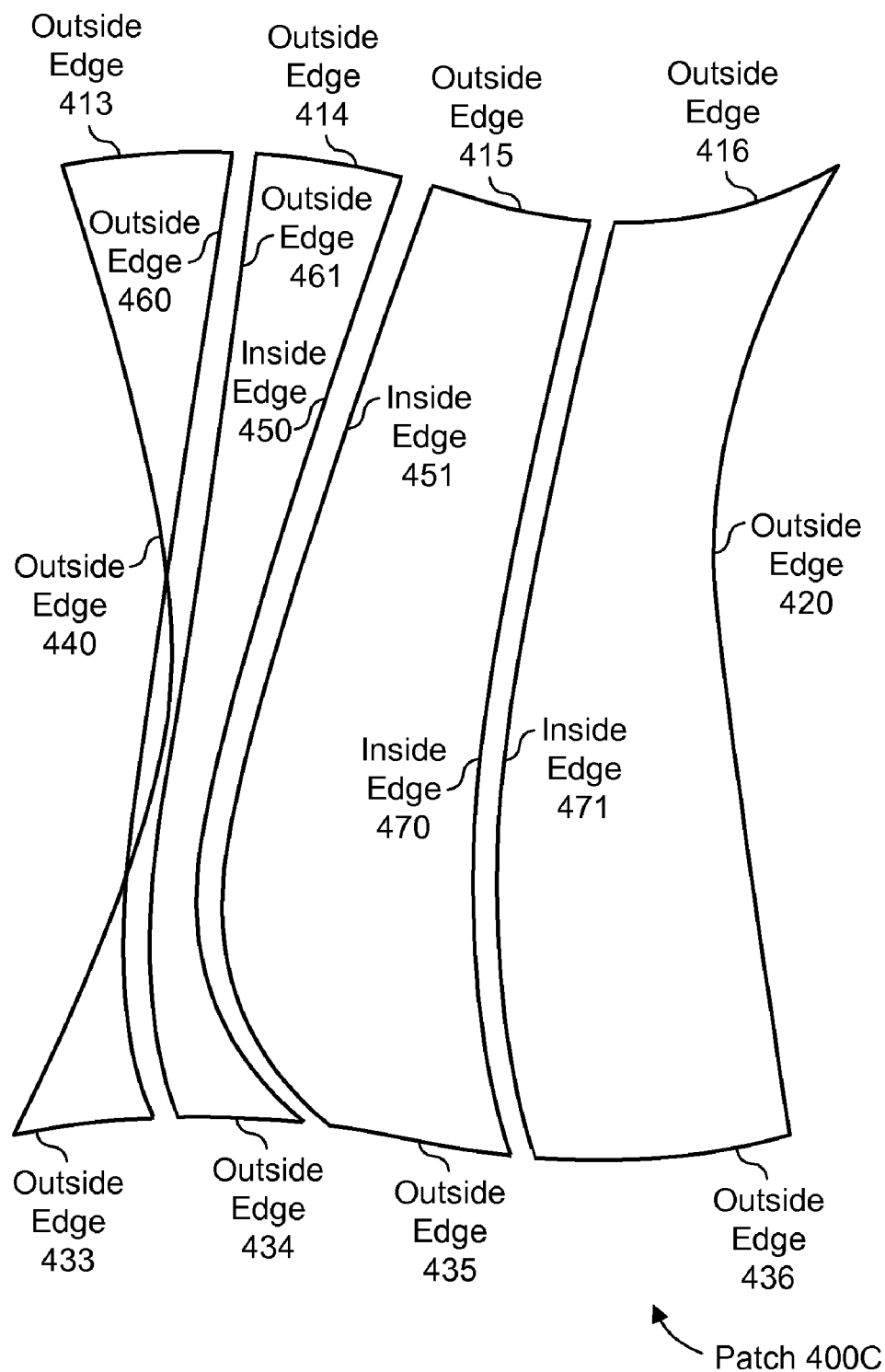
FIGS. 4C and 4D illustrate a third stage of a patch tessellation according to embodiments of a system and method for minimizing tessellation of surfaces.

The recursive subdivision may proceed for each of the two new sub-surfaces (e.g., as shown in block 310). In the example patch 400B, each of the eight edges 411, 440, 431, 450, 412, 420, 432, and 451 again fails the flatness test as shown in block 310. Therefore, as shown in block 320, each of the two sub-surfaces may be subdivided to create a total of four new sub-surfaces. FIG. 4C illustrates a third stage of a surface tessellation according to one embodiment of a system and method for minimizing tessellation of surfaces. A modified patch 400C may include four new sub-patches: a first new sub-patch having four outside edges 413, 440, 460, and 433 (with edge 460 designated as an outside edge due to the Tensor patch "bulge" test discussed above); a second new sub-patch having three outside edges 414, 461, and 434 and an inside edge 450 (with edge 461 designated as an outside edge due to the Tensor patch "bulge" test discussed above); a third new sub-patch having two outside edges 415 and 435 and two inside edges 451 and 470; and a fourth new sub-patch having three outside edges 416, 420, and 436 and an inside edge 471.

Figure 4D:
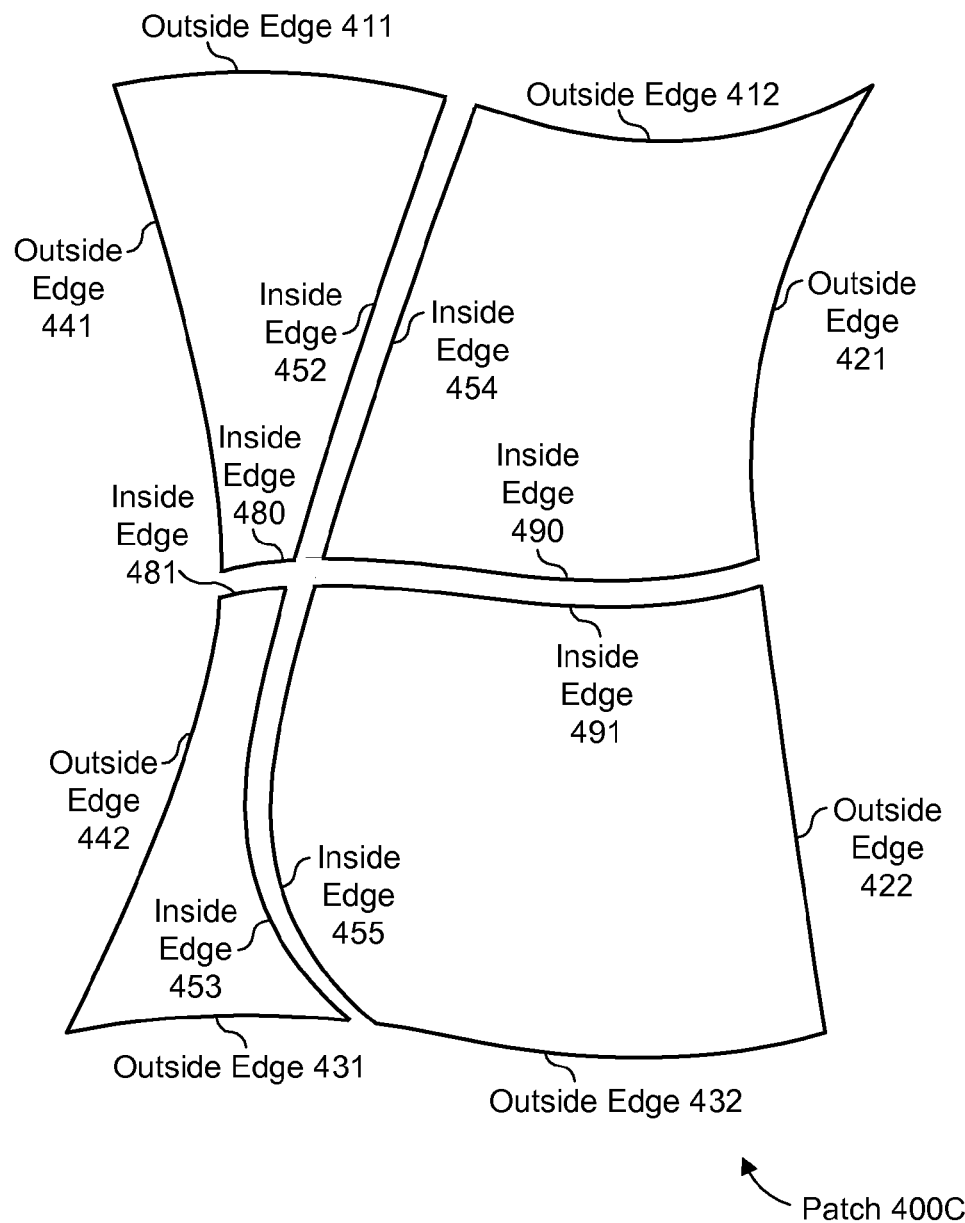

For purposes of illustration and example, FIGS. 4B and 4C illustrate successive vertical subdivisions of a patch. In one embodiment, each stage of the recursion may be performed with alternating vertical and horizontal subdivisions. FIG. 4D illustrates the third stage of a surface tessellation with alternating vertical and horizontal subdivisions according to one embodiment of a system and method for minimizing tessellation of surfaces. A modified patch 400D may include four new sub-patches: a first new sub-patch having two outside edges 411 and 441 and two inside edges 452 and 480; a second new sub-patch having two outside edges 442 and 431 and two inside edges 453 and 481; a third new sub-patch having two outside edges 412 and 421 and two inside edges 454 and 490; and a fourth new sub-patch having two outside edges 422 and 432 and two inside edges 455 and 491. Although the patches 400B, 400C, and 400D are shown with gaps between sub-patches for purposes of illustration, each pair of opposing edges generated by a split (e.g., edges 450 and 451) may comprise a single coincident edge.

Figure 5:
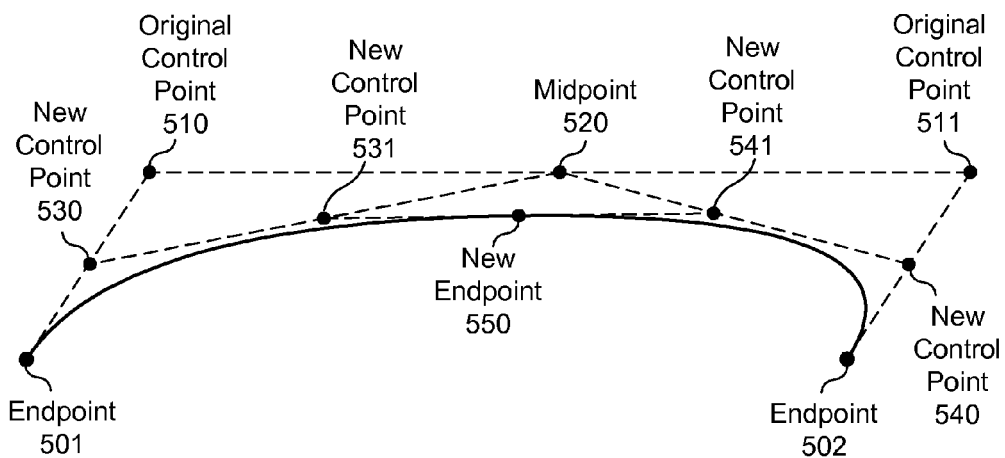
FIG. 5 illustrates aspects of a Bézier curve subdivision according to one embodiment of a system and method for minimizing tessellation of surfaces.

FIG. 5 illustrates aspects of a Bézier curve subdivision according to one embodiment of a system and method for minimizing tessellation of surfaces. A bicubic Bézier curve is defined by two endpoints 501 and 502 and two control points 510 and 511. The endpoints 501 and 502 generally determine the position of the curve, and the control points 510 and 511 generally determine the shape of the curve. A conceptual line between endpoint 501 and control point 510 may comprise a first "handle," and another conceptual line between endpoint 502 and control point 511 may comprise a second "handle." The midpoint 520 of the original Bézier curve may comprise the midpoint of a line between the control point 510 and the control point 511.

The original Bézier curve may be divided into two new Bézier curves. The endpoints of the left-hand new curve are endpoint 501 and new endpoint 550. The endpoints of the right-hand new curve are new endpoint 550 and endpoint 502. A first new control point 530 for the left-hand new curve may be located at the midpoint of a line between the endpoint 501 and the original control point 510. A second new control point 531 for the left-hand new curve may be located at the midpoint of a line between the first new control point 530 and the midpoint 520. Similarly, a second new control point 540 for the right-hand new curve may be located at the midpoint of a line between the endpoint 502 and the original control point 511. A first new control point 541 for the right-hand new curve may be located at the midpoint of a line between the second new control point 540 and the midpoint 520. The new endpoint 550 is the midpoint of a line between the new control points 531 and 541. The color and alpha values of the new endpoint 550 may be determined during the subdivision as a linear transition between the color and alpha values of the original endpoints 501 and 502.

Figure 6:
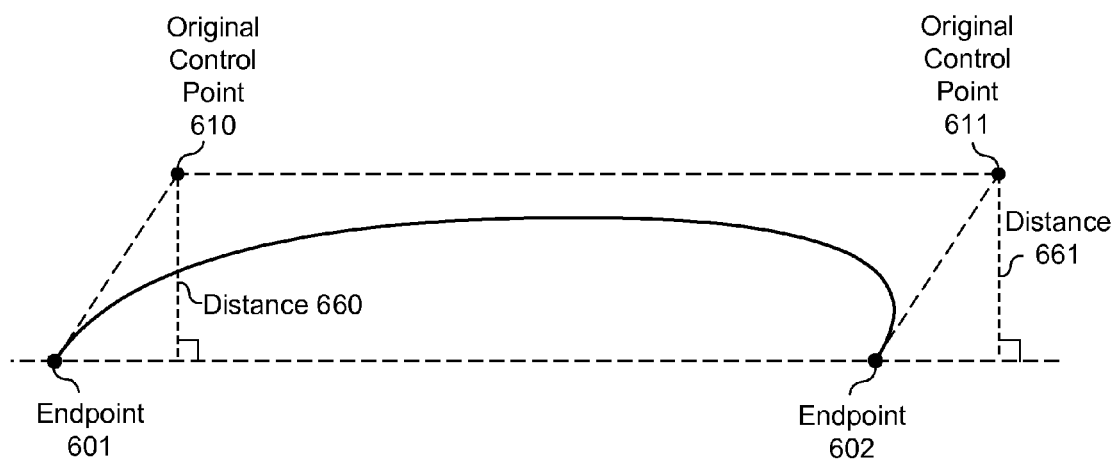
FIG. 6 illustrates aspects of an edge flatness test according to one embodiment of a system and method for minimizing tessellation of surfaces.

FIG. 6 illustrates aspects of an edge flatness test according to one embodiment of a system and method for minimizing tessellation of surfaces. Flatness may be related to the error tolerance for approximating a curved path segment as a series of straighter line segments. Flatness may comprise the maximum allowable distance between any point of the approximation from the corresponding point on the true curve. In one embodiment, flatness may be measured in device pixels (i.e., based on the target raster imaging device). As discussed above, the flatness tolerance values for inside edges and outside edges may be user-specified values or default values. A flatness tolerance value may represent a trade-off between rendering accuracy and rendering speed. For example, very small flatness values (e.g., less than one pixel) may produce very precise curves at a high performance cost due to the requirement that many line segments be generated. Larger flatness values may produce cruder approximations with substantially lower demands on computational resources. By using two different flatness tolerance values for the outside and inside of a surface, computational resources in a tessellation may be applied differentially to different areas of the surface.

The example bicubic Bézier curve shown in FIG. 6 is defined by two endpoints 601 and 602 and two control points 610 and 611. A characteristic of such curves is that they are contained entirely within the convex hull of their points (e.g., an enclosed polygon having vertices 601, 610, 602, and 611). Because the true distance from the straight line to the true curve may be an expensive calculation, the perpendicular distance may be determined between each control point 610 and 611 and a straight line (extending to infinity) between the endpoints 601 and 602. The distance 660 and distance 661 may be tested against the relevant flatness tolerance value. If either the distance 660 or the distance 661 is larger than the relevant flatness tolerance value, then recursive subdivision of the sub-surface comprising the curve may continue.

Figure 7:
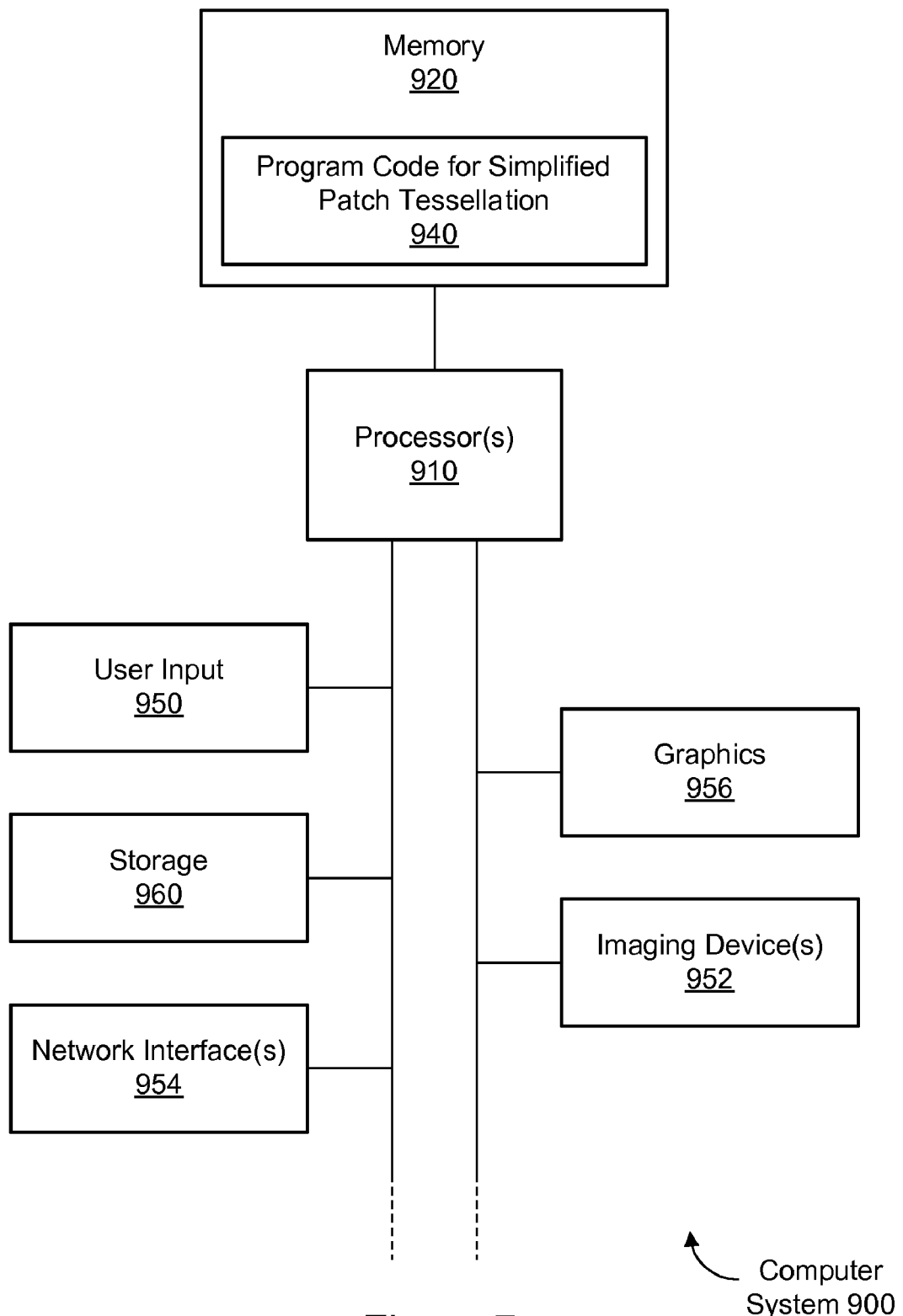
FIG. 7 is a block diagram illustrating constituent elements of a computer system that is configured to implement embodiments of the system and method for minimizing tessellation of surfaces While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

FIG. 7 is a block diagram illustrating constituent elements of a computer system 900 that is configured to implement embodiments of the system and method for minimizing tessellation of surfaces. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a graphics processing unit (GPU). Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein (e.g., for minimizing tessellation of surfaces) may be partly or fully resident within the memory 920 at the computer system 900 at any point in time. For example, the program instructions 940 may implement blocks shown in FIGS. 2 and 3 as described above. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Similarly, program instructions may be executable by a GPU in the graphics component 956 to implement aspects of the techniques described herein (e.g., for minimizing tessellation of surfaces). Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. It will be apparent to those having ordinary skill in the art that computer system 900 can also include numerous elements not shown in FIG. 7, as illustrated by the ellipsis shown.

In various embodiments, the elements shown in FIGS. 2 and 3 may be performed in a different order than the illustrated order. In FIGS. 2 and 3, any of the operations described in the elements may be performed programmatically (i.e., by a computer according to a computer program). In FIGS. 2 and 3, any of the operations described in the elements may be performed automatically (i.e., without user intervention). In one embodiment, the techniques shown in FIGS. 2 and 3 may be implemented iteratively rather than recursively.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for tessellating a surface, the method comprising:
    performing by a computer:
        initiating a recursive subdivision of the surface into a plurality of sub-surfaces, wherein each sub-surface comprises a respective plurality of edges;
        determining that each edge of the plurality of edges is either an inside edge or an outside edge relative to a plurality of boundaries of the surface, wherein each sub-surface of a first portion of the plurality of sub-surfaces comprises at least one of the outside edges, and wherein each sub-surface of a second portion of the plurality of sub-surfaces comprises a plurality of the inside edges and no outside edges;
        terminating the recursive subdivision for each sub-surface of the first portion of the plurality of sub-surfaces when a first flatness tolerance is met for each outside edge of the sub-surface; and
        terminating the recursive subdivision for each sub-surface of the second portion of the plurality of sub-surfaces when a second flatness tolerance is met for each inside edge of the sub-surface, wherein the first flatness tolerance is smaller than the second flatness tolerance.

2. The computer-implemented method as recited in claim 1, wherein the plurality of the boundaries of the surface are determined by a plurality of connected Bézier curves.

3. The computer-implemented method as recited in claim 2, wherein the plurality of the boundaries of the surface are further determined by a plurality of explicit control points.

4. The computer-implemented method as recited in claim 1, wherein the first flatness tolerance comprises a maximum allowable difference between one of the outside edges and a straight line approximating the outside edge, and wherein the second flatness tolerance comprises a maximum allowable difference between one of the inside edges and a straight line approximating the inside edge.

5. The computer-implemented method as recited in claim 1, further comprising:
    designating each of the boundaries of the surface as one of the outside edges prior to generating the plurality of sub-surfaces.

6. The computer-implemented method as recited in claim 1, wherein an edge that bulges beyond the boundaries of the surface is determined to be one of the outside edges.

7. A computer-implemented method for rendering a surface, the method comprising:
    performing by a computer:
        generating a first plurality of polygons adjacent to a plurality of boundaries of the surface, wherein each of the first plurality of polygons comprises at least one outside edge approximating a straight line within a first flatness tolerance; and
        generating a second plurality of polygons on the interior of the surface, wherein each of the second plurality of polygons comprises a plurality of inside edges approximating the straight line within a second flatness tolerance, wherein the first flatness tolerance is smaller than the second flatness tolerance.

8. The computer-implemented method as recited in claim 7, wherein the plurality of the boundaries of the surface are determined by a plurality of connected Bézier curves.

9. The computer-implemented method as recited in claim 8, wherein the plurality of the boundaries of the surface are further determined by a plurality of explicit control points.

10. The computer-implemented method as recited in claim 7, further comprising:
    designating each of the boundaries of the surface as one of the outside edges prior to generating the first plurality of polygons or the second plurality of polygons.

11. The computer-implemented method as recited in claim 7, further comprising:
    receiving user input indicating a value of the first flatness tolerance or a value of the second flatness tolerance.

12. A non-transitory computer-readable storage medium storing program instructions for tessellating a surface, wherein the program instructions are computer-executable to implement:
    initiating a recursive subdivision of the surface into a plurality of sub-surfaces, wherein each sub-surface comprises a respective plurality of edges;
    determining that each edge of the plurality of edges is either an inside edge or an outside edge relative to a plurality of boundaries of the surface, wherein each sub-surface of a first portion of the plurality of sub-surfaces comprises at least one of the outside edges, and wherein each sub-surface of a second portion of the plurality of sub-surfaces comprises a plurality of the inside edges and no outside edges;
    terminating the recursive subdivision for each sub-surface of the first portion of the plurality of sub-surfaces when a first flatness tolerance is met for each outside edge of the sub-surface; and
    terminating the recursive subdivision for each sub-surface of the second portion of the plurality of sub-surfaces when a second flatness tolerance is met for each inside edge of the sub-surface, wherein the first flatness tolerance is smaller than the second flatness tolerance.

13. The non-transitory computer-readable storage medium as recited in claim 12, wherein the plurality of the boundaries of the surface are determined by a plurality of connected Bézier curves.

14. The non-transitory computer-readable storage medium as recited in claim 13, wherein the plurality of the boundaries of the surface are further determined by a plurality of explicit control points.

15. The non-transitory computer-readable storage medium as recited in claim 12, wherein the first flatness tolerance comprises a maximum allowable difference between one of the outside edges and a straight line approximating the outside edge, and wherein the second flatness tolerance comprises a maximum allowable difference between one of the inside edges and a straight line approximating the inside edge.

16. The non-transitory computer-readable storage medium as recited in claim 12, wherein the program instructions are further computer-executable to implement:
    designating each of the boundaries of the surface as one of the outside edges prior to generating the plurality of sub-surfaces.

17. The non-transitory computer-readable storage medium as recited in claim 12, wherein an edge that bulges beyond the boundaries of the surface is determined to be one of the outside edges.

18. A computer-implemented method for rendering a surface, the method comprising:
performing by a computer:
generating a first plurality of polygons adjacent to a plurality of boundaries of the surface, wherein each of the first plurality of polygons comprises at least one outside edge approximating a straight line within a first flatness tolerance; and
generating a second plurality of polygons on the interior of the surface, wherein each of the second plurality of polygons comprises a plurality of inside edges approximating the straight line within a second flatness tolerance, wherein the first flatness tolerance is smaller than the second flatness tolerance.

19. The computer-implemented method as recited in claim 18, wherein the plurality of boundaries of the surface are determined by a plurality of connected Bézier curves.

20. The computer-implemented method as recited in claim 19, wherein the plurality of boundaries of the surface are further determined by a plurality of explicit control points.

21. The computer-implemented method as recited in claim 18, wherein the program instructions are further computer-executable to implement:
designating each of the boundaries of the surface as one of the outside edges prior to generating the first plurality of polygons or the second plurality of polygons.

22. The computer-implemented method as recited in claim 18, wherein the program instructions are further computer-executable to implement:
receiving user input indicating a value of the first flatness tolerance or a value of the second flatness tolerance.

23. A system, comprising:
at least one processor; and
a memory coupled to the at least one processor, wherein the memory is configured to store program instructions executable by the at least one processor to:
initiate a recursive subdivision of a surface into a plurality of sub-surfaces, wherein each sub-surface comprises a respective plurality of edges;
determine that each edge of the plurality of edges is either an inside edge or an outside edge relative to a plurality of boundaries of the surface, wherein each sub-surface of a first portion of the plurality of sub-surfaces comprises at least one of the outside edges, and wherein each sub-surface of a second portion of the plurality of sub-surfaces comprises a plurality of the inside edges and no outside edges;
terminate the recursive subdivision for each sub-surface of the first portion of the plurality of sub-surfaces when a first flatness tolerance is met for each outside edge of the sub-surface; and
terminate the recursive subdivision for each sub-surface of the second portion of the plurality of sub-surfaces when a second flatness tolerance is met for each inside edge of the sub-surface, wherein the first flatness tolerance is smaller than the second flatness tolerance.

24. The system as recited in claim 23, wherein the plurality of the boundaries of the surface are determined by a plurality of connected Bézier curves.

25. The system as recited in claim 24, wherein the plurality of the boundaries of the surface are further determined by a plurality of explicit control points.

26. The system as recited in claim 23, wherein the first flatness tolerance comprises a maximum allowable difference between one of the outside edges and a straight line approximating the outside edge, and wherein the second flatness tolerance comprises a maximum allowable difference between one of the inside edges and a straight line approximating the inside edge.

27. The system as recited in claim 23, wherein the program instructions are further executable by the at least one processor to:
designate each of the boundaries of the surface as one of the outside edges prior to generating the plurality of sub-surfaces.

28. The system as recited in claim 23, wherein an edge that bulges beyond the boundaries of the surface is determined to be one of the outside edges.

29. A system, comprising:
at least one processor; and
a memory coupled to the at least one processor, wherein the memory is configured to store program instructions executable by the at least one processor to:
generate a first plurality of polygons adjacent to a plurality of boundaries of a surface, wherein each of the first plurality of polygons comprises at least one outside edge approximating a straight line within a first flatness tolerance; and
generate a second plurality of polygons on the interior of the surface, wherein each of the second plurality of polygons comprises a plurality of inside edges approximating the straight line within a second flatness tolerance, wherein the first flatness tolerance is smaller than the second flatness tolerance.

30. The system as recited in claim 29, wherein the plurality of the boundaries of the surface are determined by a plurality of connected Bézier curves.

31. The system as recited in claim 30, wherein the plurality of the boundaries of the surface are further determined by a plurality of explicit control points.

32. The system as recited in claim 29, wherein the program instructions are further executable by the at least one processor to:
designate each of the boundaries of the surface as one of the outside edges prior to generating the first plurality of polygons or the second plurality of polygons.

33. The system as recited in claim 29, wherein the program instructions are further executable by the at least one processor to:
receive user input indicating a value of the first flatness tolerance or a value of the second flatness tolerance.

* * * * *